United States Patent Office 2,748,137
Patented May 29, 1956

2,748,137
PROCESS FOR PREPARING ISONICOTINIC ACID

Martin Everett Hultquist, Bound Brook, and Robert S. Barker, Plainfield, N. J., assignors to American Cyanamid Company, New York, N. Y., a corporation of Maine No Drawing. Application September 26, 1952,
Serial No. 311,775

2 Claims. (Cl. 260—295)

This invention relates to a process of oxidizing a 4-vinyl pyridine to isonicotinic acid.

The production of isonicotinic acid has assumed a great deal of importance in conjunction with the manufacture of the tuberculostatic drug isonicotinic acid hydrazide. The most readily available source of raw material for preparing isonicotinic acid is mixed beta and gamma picolines. However, these compounds are not readily separated since they boil so closely together. Therefore, there is a need for processes which provide raw materials which oxidize only to isonicotinic acid. We have found that 4-vinyl pyridines are readily oxidized either with mixed nitric and sulfuric acids or even with nitric acid alone to give isonicotinic acid which can be recovered by simple and conventional means in a high state of purity.

It is a simple matter to obtain various 4-vinyl pyridines uncontaminated by any considerable amount of beta picoline. This is effected by reacting a mixture of beta and gamma picolines with an aromatic aldehyde such as benzaldehyde to produce a substituted vinyl pyridine such as 4-styryl pyridine or by reacting with an aliphatic aldehyde such as formaldehyde, acetaldehyde and the like and dehydrating the corresponding 4-(beta-hydroxyalkyl) pyridine. In both cases the vinyl or substituted vinyl pyridines are readily separated from the beta picolines as there is a marked difference in boiling point. Oxidation of the vinyl pyridines is easier than in the case of gamma picoline and it is therefore possible to oxidize a mixture of beta-picoline and the 4-vinyl pyridine without separation by using relatively milder oxidation conditions. The elimination of the separation step before oxidation is sometimes of economic importance as it is necessary to recover the isonicotinic acid produced in any event and it is frequently possible to combine this recovery with the separation from unreacted beta picoline. The present invention therefore includes oxidation of 4-vinyl pyridines whether in the pure state or admixed with beta picoline.

The oxidation procedure may be the one which has been used regularly to oxidize various beta alkyl pyridines to nicotinic acid, namely, the high temperature oxidation with a mixture of nitric and sulfuric acids. It is also possible to effect oxidation of the vinyl pyridines with nitric acid without strong sulfuric acid, and this procedure may be used when mixtures of the 4-vinyl pyridines with beta picolines are to be oxidized.

Another method which can be used and which is included but not claimed in the present invention is the use of the reaction product of ferric bromide and nitric acid as a catalyst to effect oxidation by means of sulfuric acid and sulfur trioxide. This process is described and claimed in the copending application of Barker and Ebel, Serial No. 311,774, filed September 26, 1952, now abandoned.

The invention will be described in greater detail in conjunction with the following specific examples, the parts being by weight unless otherwise specified.

Example 1

Ninety parts of 96% sulfuric acid is introduced into a reactor and heated at 300° C. To this reaction mixture there is gradually added a mixture of 1000 parts of mixed acid analyzing 18% nitric acid, 14% sulfur trioxide and 68% sulfuric acid and 200 parts of 4-styryl pyridine dissolved in 620 parts of 96% sulfuric acid. The reactor is equipped with an overflow and the temperature maintained during reaction at 310° C. The rate at which the mixture of the styryl pyridine and mixed acid is added is regulated so that the average dwell in the reaction zone is approximately 1½ hours. The reaction mixture is neutralized with caustic soda and then treated with copper sulfate to precipitate the isonicotinic acid produced as a copper salt. This purification method is that conventionally used in recovering nicotinic acid.

Example 2

The procedure of Example 1 is repeated replacing the styryl pyridine with a corresponding amount of 4-beta-methyl vinyl pyridine. A good yield is obtained. The amount of oxidizing agent, however, is greater as the additional methyl group requires further oxidation to carbon dioxide and water.

Example 3

To 140 parts of 70% nitric acid at a temperature of 80 to 90° C. there is added a slurry of 50 parts water, 28 parts of 70% nitric acid and 20 parts of 4-vinyl pyridine. Considerable evolution of nitric oxide fumes takes place and after fuming stops, the solution is heated until it boils and evaporated down until the boiling point reaches 120–125° C. At this higher temperature further evolution of nitric oxide takes place and the temperature is maintained until oxidation has proceeded as far as it goes at this lower temperature. The temperature is then gradually raised, finally reaching 145° C. and small amounts of 70% nitric acid are added from time to time to replace that lost in the fumes.

A solution is obtained which is partly crystallized. It is diluted with 50 parts of water, the pH brought to 3.5 by means of a 50% aqueous sodium hydroxide solution and the isonicotinic acid solution precipitated, filtered off, washed with water and acetone and dried. A good grade of isonicotinic acid is obtained.

Example 4

The procedure of Example 3 is followed, but instead of using separated 4-vinyl pyridine, a mixture of 4-styryl pyridine and beta picoline is used. This mixture is obtained by treating mixed beta and gamma picolines with benzaldehyde. The 4-styryl pyridine oxidizes smoothly and there is no substantial oxidation of the beta picoline.

The solution obtained after the reaction is completed is diluted with an equal volume of water, cooled, filtered to remove benzoic acid and any nitrobenzoic acid formed and brought to a pH of 3.5 with a 50% aqueous sodium hydroxide solution. Isonicotinic acid precipitates, is filtered off, washed and dried.

The mother liquor from the filtration is brought to a pH of 8–9 with alkali and is then extracted with an organic solvent for beta picoline, or alternatively, steam distilled to remove the unreacted beta picoline along with small amounts of gamma picoline which remain as the reaction of benzaldehyde with the original mixed picolines is not quite 100% complete. The recovered beta picoline with a small amount of gamma picoline may be used for the preparation of nicotinic acid or for other purposes.

Example 5

To a mixture of 70 parts of 70% nitric acid and 20 parts of water at 115 to 120° C. there is added 20 parts of 4-styryl pyridine. A considerable amount of nitric oxide fumes evolves. After evolution has substantially ceased, the solution is heated up to 100–120° C., maintained for a sufficient period of time to effect the oxidation which takes place at that temperature, and then boiled to evaporate off water until the temperature reaches 135° C., at which temperature the reaction is allowed to go to substantial completion.

100 parts of water are then added, the solution cooled and a benzoic acid-nitrobenzoic acid mixture which crystallizes out filtered off and washed with water.

The filtrate from the precipitate is then adjusted to a pH of 3.5 with 50% aqueous sodium hydroxide solution and cooled. Isonicotinic acid precipitates out, is filtered, washed with water and then with methanol which removes a small amount of tarry by-product. A good grade of isonicotinic acid, light-yellow in color, is obtained in excellent yield.

We claim:

1. A process of preparing isonicotinic acid from a mixture of gamma and beta picoline which comprises (1) reacting the mixed picolines with benzaldehyde to convert the gamma picoline into 4-styryl pyridine and produce a reaction mixture containing beta picoline and said 4-styryl pyridine, (2) heating said mixture with a strongly acid oxidizing agent at a temperature from 100° to 145° C. until said 4-styryl pyridine is oxidized and converted into isonicotinic acid, the temperature and time of heating being sufficient to convert the 4-styryl pyridine into isonicotinic acid but insufficient to oxidize any substantial amount of the beta picoline, (3) recovering the isonicotinic acid so obtained, and (4) separately recovering the unreacted beta picoline.

2. The process of claim 1 wherein the said strongly acid oxidizing agent is nitric acid.

References Cited in the file of this patent

UNITED STATES PATENTS

| 2,513,099 | Mueller | June 27, 1950 |
| 2,513,251 | Porter et al. | June 27, 1950 |
| 2,522,163 | Cislak et al. | Sept. 12, 1950 |

FOREIGN PATENTS

| 568,889 | Great Britain | Apr. 25, 1945 |

OTHER REFERENCES

Beilstein: vol. 20, p. 256.

Maier-Bode: "Pyridin und seine Derivate," page 212 (1934).